Sept. 23, 1947.  M. E. HAINES  2,427,780
AIR CONDITIONING OF BUILDINGS BY PASSING
AIR THROUGH HOLLOW FOUNDATION BLOCKS
Filed June 10, 1944  3 Sheets-Sheet 1
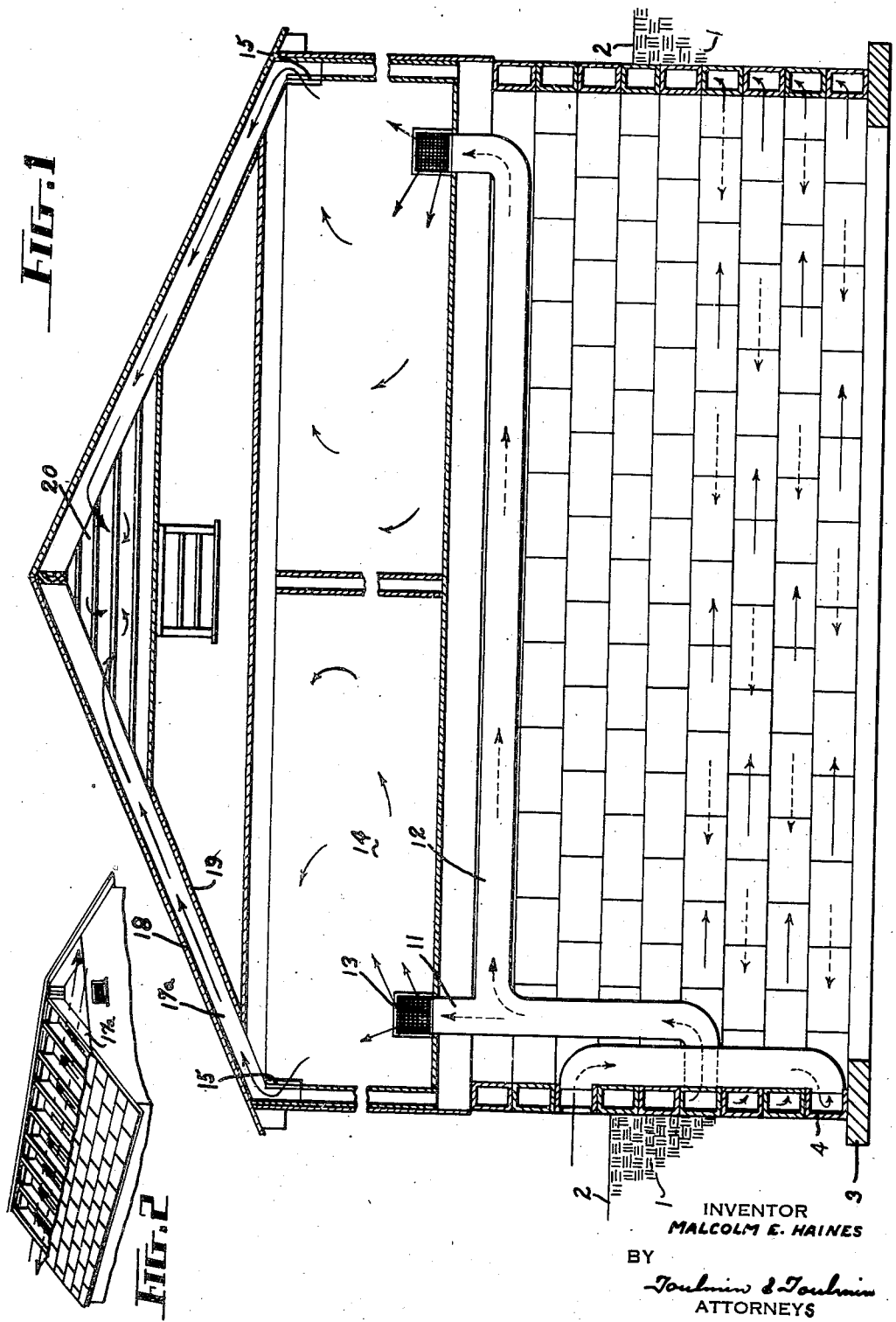
INVENTOR
MALCOLM E. HAINES
BY
Toulmin & Toulmin
ATTORNEYS Sept. 23, 1947.  M. E. HAINES  2,427,780
AIR CONDITIONING OF BUILDINGS BY PASSING
AIR THROUGH HOLLOW FOUNDATION BLOCKS
Filed June 10, 1944  3 Sheets-Sheet 2
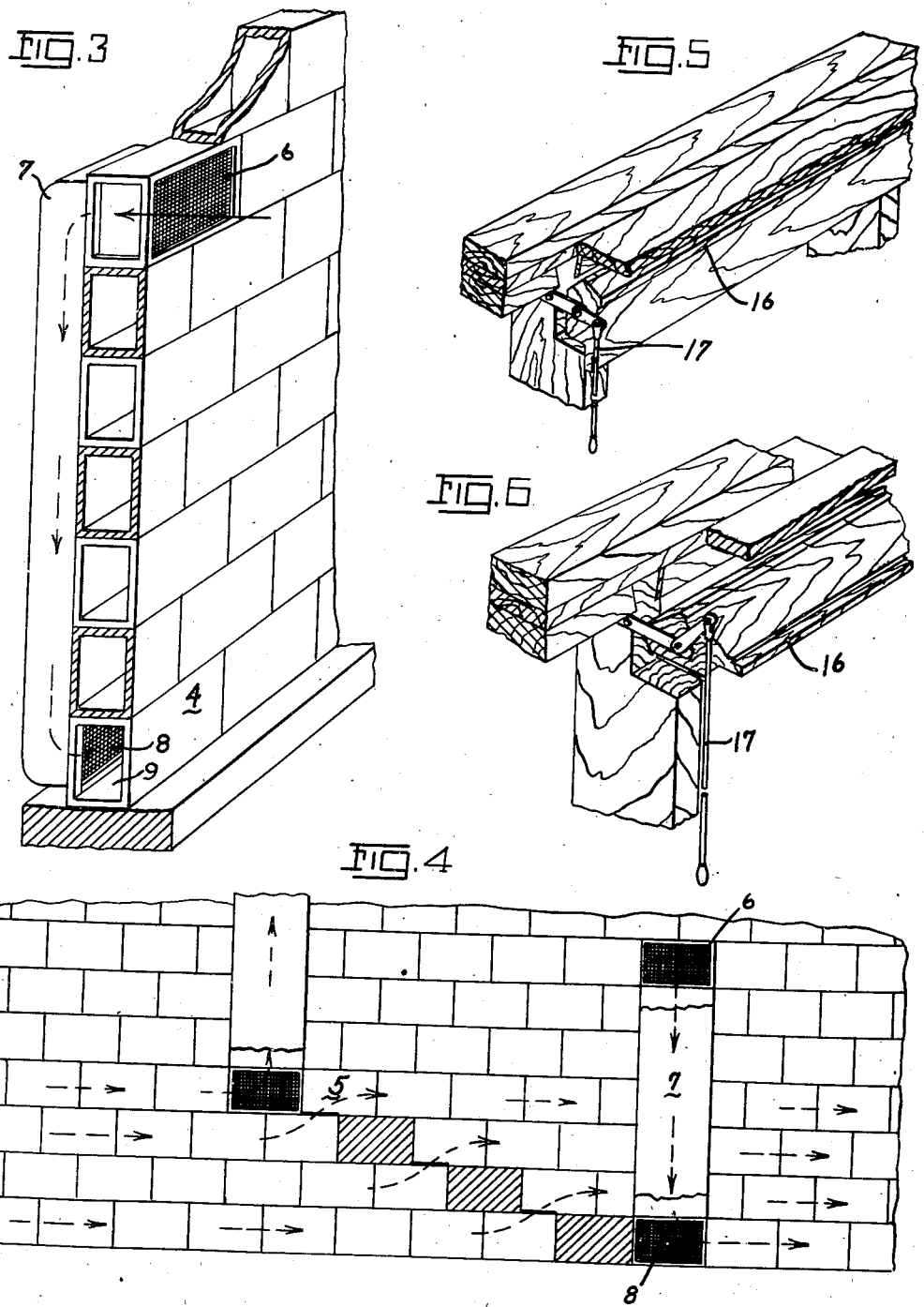
INVENTOR
MALCOLM E. HAINES
BY
ATTORNEYS Sept. 23, 1947.   M. E. HAINES   2,427,780
AIR CONDITIONING OF BUILDINGS BY PASSING
AIR THROUGH HOLLOW FOUNDATION BLOCKS
Filed June 10, 1944   3 Sheets-Sheet 3
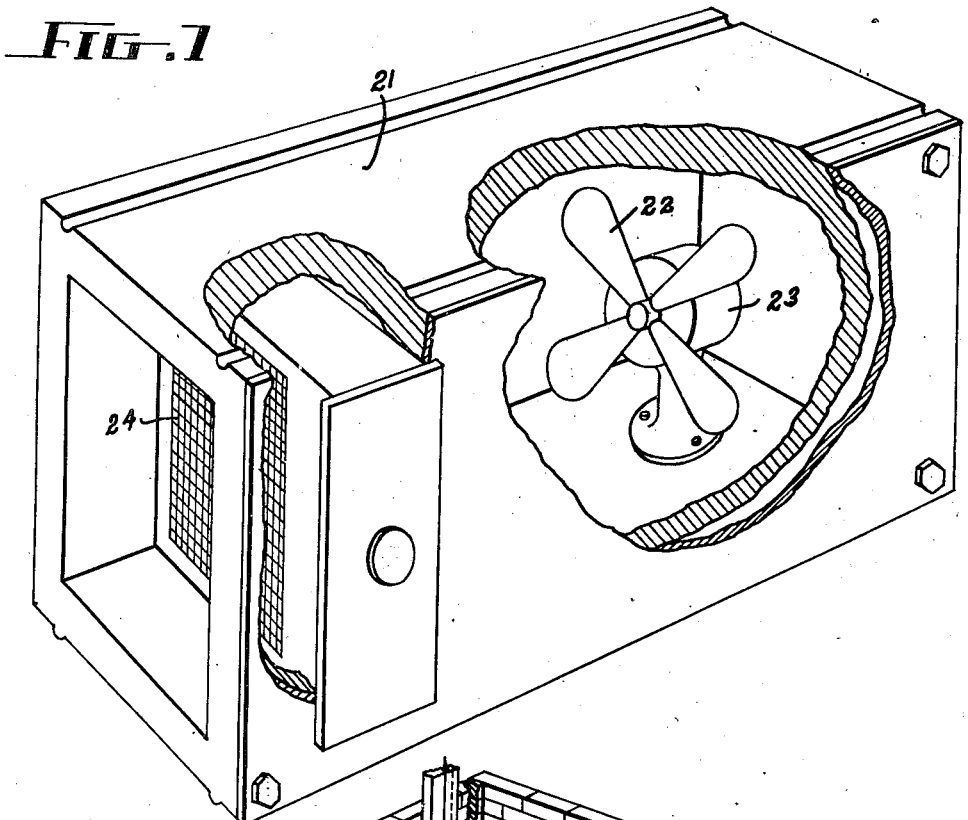
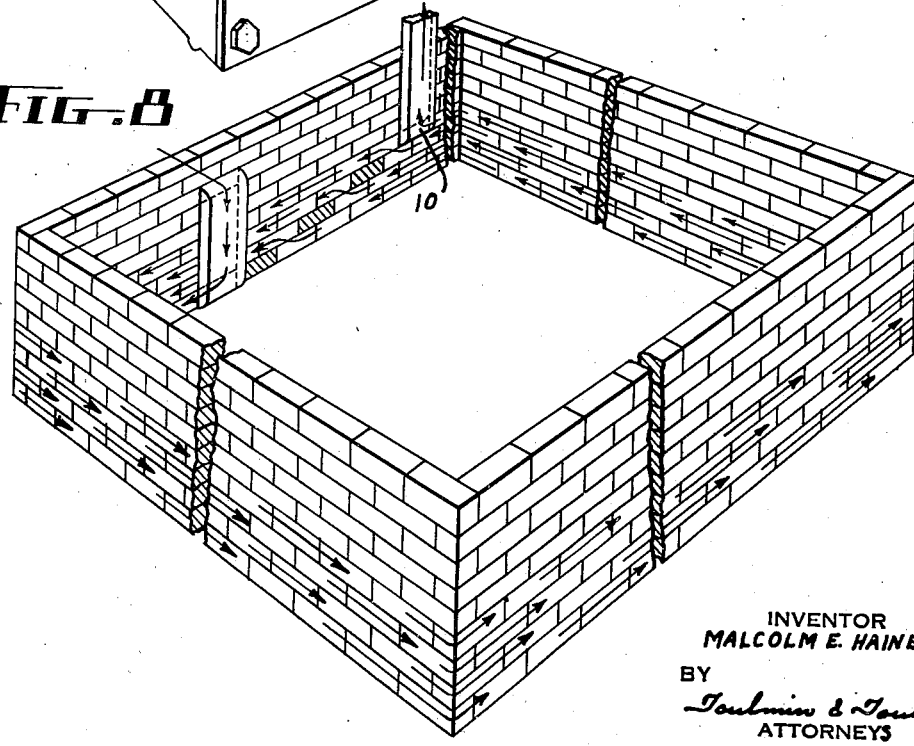
INVENTOR
MALCOLM E. HAINES
BY
Toulmin & Toulmin
ATTORNEYS Patented Sept. 23, 1947

2,427,780

UNITED STATES PATENT OFFICE 2,427,780

AIR CONDITIONING OF BUILDINGS BY PASSING AIR THROUGH HOLLOW FOUNDATION BLOCKS

Malcolm E. Haines, Xenia, Ohio, assignor to The McDowell & Torrence Lumber Company, Xenia, Ohio, a corporation of Ohio Application June 10, 1944, Serial No. 539,698

3 Claims. (Cl. 98—31)

My invention relates to air conditioning and particularly to utilization of convection currents in connection with the use of foundation materials as a circulatory system for precooling and tempering of incoming air.

It is the object of this invention to provide an air conditioning system characterized by the fact that the incoming air is passed through the foundation of a building which is utilized as a circulatory system for pretempering the incoming air after which the air is circulated by convection through the rooms of the building and out through the upper story of the building.

It is a further object of the invention to provide a complete circulatory system within the foundation adjacent to the earth in which the foundation is placed so as to provide an extended contact surface over which the air circulates prior to being drawn by convection current into the building.

It is a further object of the invention to provide a pretempering system dependent upon hollow members connected together constituting a foundation of a building from which the incoming air is drawn, circulated through a building and discharged through the upper part thereof.

It is a further object of the invention to provide the heat from the roof of a building applied to air in the attic of the building in order to cause circulation of air from a point adjacent the foundation through the building and out through the roof.

It is a further object to provide circulation of the outgoing air adjacent to the under side of the roof in order to provide an insulated area for insulating the building from external heat on the roof.

It is a further object of the invention to provide means of taking air into a building from approximately the level of the ground and delivering to a point below the level of the ground and thereafter circulating it in a continuous pathway at different levels below the surface of the ground until the temperature of subsurface conditions is imparted to the air and thereafter withdrawing the air and delivering it to the interior of the building and thereafter withdrawing it from the top of the building and delivering it out of the building near the top thereof.

Referring to the drawings:

Figure 1 is a vertical section through a building showing the foundation in sections and the nature of the circulatory system through the foundation; further illustrating the circulatory pathway of the incoming, circulating and departing air.

Figure 2 is a perspective with the roof partially broken away to show the nature of the circulatory system at the ridge of the roof.

Figure 3 is a portion of the wall of the foundation shown in section and broken away to indicate the nature of the circulatory system, particularly with reference to the incoming air at ground level and the method of its delivery to the bottom of the foundation below ground level.

Figure 4 is a fragmentary view partially broken away, showing the circulatory system as applied to the interior of the wall and particularly with reference to the method of interconnecting the successive layers of the foundation so as to provide a spiral circulatory system for the air within the walls of the foundation.

Figure 5 is a perspective partly broken away showing the damper control system, utilized for regulating the circulation of air through the building.

Figure 6 is a similar view to Figure 5 showing the damper in an open position.

Figure 7 shows a perspective, partially broken away, of a forced draft circulatory box and filter indicating the adaptation of forced draft circulation to the convection type circulatory system.

Figure 8 is a perspective, partly broken away, showing the complete circulatory system through the foundation prior to the delivery of the tempered air to the upper portions of the building.

Referring to the drawings in detail I designates the ground, the level of which is designated at 2, while the base of the foundation embedded within the ground is indicated at 3. This base or floor is used as a support for the foundation wall consisting of the hollow blocks 4. These blocks 4 are arranged to overlap one another in successive levels. At intervals as at 5 the top and bottom of adjacent overlapping blocks 4 are open to permit passage of air from one horizontal layer of blocks into the next adjacent layer of blocks. This is more clearly seen in Figure 8 where the blocks are broken away to indicate the transfer of the air from one level to the other. In this way the air is caused to make a complete circuit of the foundation on one level and is then permitted to escape upwardly into the next level of foundation blocks where it again circulates a complete circuit before it passes into the next succeeding upper layer of blocks. In this manner the air will make a number of circuits below ground level over the interior surfaces of the foundation blocks which have been cooled by reason of being embedded in the earth below the level of the ground 2. As the temperature of the earth below the level of the ground is below that of the atmosphere, the air is thus brought to a precooled condition before it is delivered upwardly into the rooms of the building resting upon the foundation.

In order to introduce the air into the series of hollow foundation blocks, the system employed is to draw the air in through the screen 6 and then into the downwardly extending duct 7 on the interior of the foundation wall which extends to the bottom of the wall and discharges the air through the screen 8 into the interior 9 of the lower layer of blocks 4 in which it circulates the complete circuit before passing upwardly through the passageway 5 into the next adjacent superior layer of blocks for another circuit of the foundation. It is evident that suitably positioned openings may be provided between the hollow blocks at the corners of the foundation to permit continuity of the passageway at each block level.

When the air has completed its circulation through the hollow foundation it enters the bottom of the duct 10 and passes upwardly through the circulatory ducts 11 and 12 out of the grill 13 into the room 14 whence the air passes by convection through the opening 15 which is controlled by the damper 16 actuated by the lever system 17. The air then passes upwardly between the rafters 17a of the roof 18 which forms a passageway with the roof and with the lining of the roof 19. In this manner the air is thoroughly heated and is kept adjacent to the roof and thereby accelerated by being heated. This results in the air rising and passing out through the louver openings 20.

Referring to Figure 7, there is provided in a block 21 a fan 22 driven by an electric motor 23 which is arranged to deliver air from the exterior of the building through the screen or filter 24 into the interior of the building. This is utilized in the event convection currents are not sufficient for the circulation desired.

It is desired to comprehend within my invention and as in the scope of the hereinafter appended claims such modifications as may be necessary to adapt my invention to various uses and conditions of operation.

I claim:

1. In combination, in a building, of a foundation comprising a plurality of superimposed building blocks, each block having a horizontal opening throughout its length which forms a continuous passageway along each course when the blocks are laid end-to-end, a partition in each passageway to interrupt its continuity, an opening in a block adjacent said partition and in the same course, a second opening in a block in the course above said first opening and communicating therewith so that the beginning of each passageway communicates with the end of the passageway of the lower adjacent course, and the beginning of the lowermost passageway being in communication with the atmosphere outside of the foundation, the end of the uppermost passageway being in communication with the interior of the building whereby air admitted to the lowermost passageway can circulate through all the passageways in series toward the uppermost passageway and then flow into the building.

2. In combination, in a building, of a foundation comprising a plurality of courses of building blocks, each block having a horizontal opening throughout its length, which forms continuous passageway along each course when the blocks are laid end-to-end, a blocking partition in each passageway to provide beginning and terminating portions therefor, a conduit extending between the beginning portion of one passageway and the end portion of the next lower passageway of each course, said conduit including an opening in a block adjacent said partition, with a second opening in a block in the course above said opening and communicating therewith, a conduit extending from the end portion of the uppermost passageway into the building, and a conduit extending from the beginning portion of the lowermost passageway to the atmosphere outside of said foundation.

3. In combination, in a building, of a foundation comprising a plurality of courses of building blocks, each block having a horizontal opening throughout its length which forms a continuous passageway along each course when the blocks are laid end-to-end, a blocking partition in each passageway to provide beginning and terminating portions therefor, a conduit extending from the beginning portion of the lowermost passageway and the atmosphere outside of the foundation, an opening in a block adjacent said partition, an opening in a block in the course above said first opening and communicating therewith in order that the passageways through the blocks are connected together in series throughout the various courses, and a conduit extending from the terminating portion of the uppermost passageway into the building, said building having a confined passageway along the inner surface of the roof to an exhaust opening, and means for presenting the air delivered by the last mentioned conduit which passes through the building into the roof passageway.

MALCOLM E. HAINES.

REFERENCES CITED

The following references are of record in the file of this patent:

UNITED STATES PATENTS

| Number | Name | Date |
|---|---|---|
| 2,210,960 | St. Pierre | Aug. 13, 1940 |
| 1,454,310 | Booraem | May 8, 1923 |
| 1,058,949 | Diebel | Apr. 15, 1913 |
| 1,065,762 | Ainsworth et al. | June 24, 1913 |
| 2,333,556 | Quatman | Nov. 2, 1943 |
| 982,721 | Hodges | Jan. 24, 1911 |
| 1,148,228 | Higgins | July 27, 1915 |
| 2,192,567 | Waugh | Mar. 5, 1940 |